(12) United States Patent
Yumer et al.

(10) Patent No.: US 10,552,730 B2
(45) Date of Patent: Feb. 4, 2020

(54) PROCEDURAL MODELING USING AUTOENCODER NEURAL NETWORKS

(71) Applicant: ADOBE INC., San Jose, CA (US)

(72) Inventors: Mehmet Ersin Yumer, San Jose, CA (US); Radomir Mech, Mountain View, CA (US); Paul John Asente, Redwood City, CA (US); Gavin Stuart Peter Miller, Los Altos, CA (US)

(73) Assignee: ADOBE INC., San Jose, CA (US)

( * ) Notice: Subject to any disclaimer, the term of this patent is extended or adjusted under 35 U.S.C. 154(b) by 977 days.

(21) Appl. No.: 14/788,178

(22) Filed: Jun. 30, 2015

(65) Prior Publication Data

US 2017/0004397 A1    Jan. 5, 2017

(51) Int. Cl.
*G06N 3/04* (2006.01)
(52) U.S. Cl.
CPC .................. *G06N 3/0454* (2013.01)
(58) Field of Classification Search
CPC .............. G06N 3/00; G06N 99/005
See application file for complete search history.

(56) References Cited

U.S. PATENT DOCUMENTS

2002/0050988 A1* 5/2002 Petrov ............... G06K 9/20
                                                            345/418

OTHER PUBLICATIONS

Hultquist, Carl. "An Adjective Interface for Procedural Content Generation" 2008 [Online] Downloaded Dec. 14, 2017 https://open. uct.ac.za/bitstream/handle/11427/6401/thesis_sci_2008_hultquist_carl.pdf?sequence=1.*
Hsih, CHaur-Heh, Ping S Huang and Ming-Da Tang. "Human Action Recognition Using Silhouette Histogram" 2011 [Online] Downloaded Dec. 14, 2017 http://crpit.com/confpapers/CRPITV113Hsieh.pdf.*
Liu, Guang Hai et al "Image Retrieval Basd on mutli-texton histogram" 2010 [Online] downloaded Dec. 14, 2017 http://www4.comp.polyu.edu.hk/~cslzhang/paper/MTH.pdf.*
Manevitz, Larry and Malik Yousef "One-class document classification via Neural Networks" 2007 [Online] Downloaded Dec. 14, 2017 https://ac.els-cdn.com/S092523120600261X/1-s2.0-S092523120600261X-main.pdf?_tid=2f1d3866-e131-11e7-bdfb-00000aab0f6c&acdnat=1513298882_332e562ed1cbef8daca4ead85983a1e3.*

(Continued)

*Primary Examiner* — Ben M Rifkin
(74) *Attorney, Agent, or Firm* — Shook, Hardy & Bacon LLP

(57) ABSTRACT

An intuitive object-generation experience is provided by employing an autoencoder neural network to reduce the dimensionality of a procedural model. A set of sample objects are generated using the procedural model. In embodiments, the sample objects may be selected according to visual features such that the sample objects are uniformly distributed in visual appearance. Both procedural model parameters and visual features from the sample objects are used to train an autoencoder neural network, which maps a small number of new parameters to the larger number of procedural model parameters of the original procedural model. A user interface may be provided that allows users to generate new objects by adjusting the new parameters of the trained autoencoder neural network, which outputs procedural model parameters. The output procedural model parameters may be provided to the procedural model to generate the new objects.

19 Claims, 7 Drawing Sheets

(56) References Cited

OTHER PUBLICATIONS

Ciresan, Dan C et al "Flexible, High performacne Concolutional Neural Networks for Image Classification" 2011 [Online] Downloadd Dec. 14, 2017 https://open.uct.ac.za/bitstream/handle/11427/6401/thesis_sci_2008_hultquist_carl.pdf?sequence=1.*

Huang, Shi-Sheng et al "Qualitative ORgnization of COllections of Shapes via Quartet Analysis" 2013 [Online] downlaoded Dec. 14, 2017 http://delivery.acm.org/10.1145/2470000/2461954/a71-huang.pdf?ip=151.207.250.61&id=2461954&acc=ACTIVE%20SERVICE&key=C15944E53D0ACA63%2E4D4702B0C3E38B35%2E4D4702B0C3E38B35%2E4D4702B0C3E38B35&CFID=840600385&CFTOKEN=368188.*

G.E> Hinton and R. R. Salakhutdinov "Reducing the Dimensionality of Data with Neural Networks" Jul. 2006 [Online] Downloaded Nov. 30, 2018 http://science.sciencemag.org/content/313/5786/504/tab-pdf (Year: 2006).*

Loic Simon et al. "Random Exploration of the Procedural Space for Single-View 3D MOdeling of Buildings" 2011 [Online] Downloaded Nov. 30, 2018 https://link.springer.com/content/pdf/10.1007%2Fs11263-010-0370-6.pdf (Year: 2011).*

George Kelly and Hugh McCabe "Citygen: An Interactive System for Procedural City Generation" 2007 [Online] Downloaded Nov. 30, 2018 http://www.citygen.net/files/citygen_gdtw07.pdf (Year: 2007).*

Talton, J. O., Gibson, D., Yang, L., Hanrahan, P., & Koltun, V. (2009). Exploratory modeling with collaborative design spaces. ACM Transactions on Graphics—TOG, 28(5), 167.

Lienhard, S., Specht, M., Neubert, B., Pauly, M., & Müller, P. (May 2014). Thumbnail galleries for procedural models. In Computer Graphics Forum (vol. 33, No. 2, pp. 361-370).

Huang, S. S., Shamir, A., Shen, C. H., Zhang, H., Sheffer, A., Hu, S. M., & Cohen-Or, D. (2013). Qualitative organization of collections of shapes via quartet analysis. ACM Transactions on Graphics (TOG), 32(4), 71.

* cited by examiner

PROCEDURAL MODELING USING AUTOENCODER NEURAL NETWORKS

BACKGROUND

Procedural modeling allows computer-generated objects having complex phenomena and geometry to be created using a set of parametric, conditional or stochastic rules. As such, procedural approaches in geometry modeling create an abstraction layer between the user and the geometry that alleviates the need for tedious direct geometric editing. A wide variety of object categories can be modeled using procedural modeling including organic shapes, such as trees and animated characters, as well as man-made shapes, such as buildings, furniture, and jewelry. Once a procedural model for an object category is available, it can be used to create a rich set of unique objects by varying the parameters of the procedural rule set. For instance, a user interface may be provided that exposes and allows a user to control the various parameters of a procedural model in order to generate objects. However, often times the underlying parametric space is very high-dimensional and its mapping to geometry is complex, thus making the resulting geometry difficult to control and explore using direct parameter editing. In other words, given a high number of procedural model parameters and the interaction between the parameters in forming objects, it may be difficult and/or very time-consuming for a user to generate an object of a desired shape.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention generally relate to enabling the generation of computer-generated objects by using an autoencoder neural network to reduce the dimensionality of a procedural model. This allows users to create objects by varying a smaller number of parameters as opposed to a larger set of parameters provided by the original procedural model. A set of sample objects are generated using the procedural model. In embodiments, the sample objects may be selected according to visual features such that the sample objects are uniformly distributed in visual appearance. Both procedural model parameters and visual features from the sample objects are used to train an autoencoder neural network. By using visual features, as opposed to procedural model parameters alone, the autoencoder neural network is trained to provide object generation driven primarily by visual appearance, which is more intuitive to users. A user interface may be provided that allows users to generate new objects by adjusting a small number of parameters of the trained autoencoder neural network, which outputs procedural model parameters. The output procedural model parameters may be provided to the procedural model to generate the new objects.

BRIEF DESCRIPTION OF THE DRAWINGS

The present invention is described in detail below with reference to the attached drawing figures, wherein.

DETAILED DESCRIPTION

Figure 1:
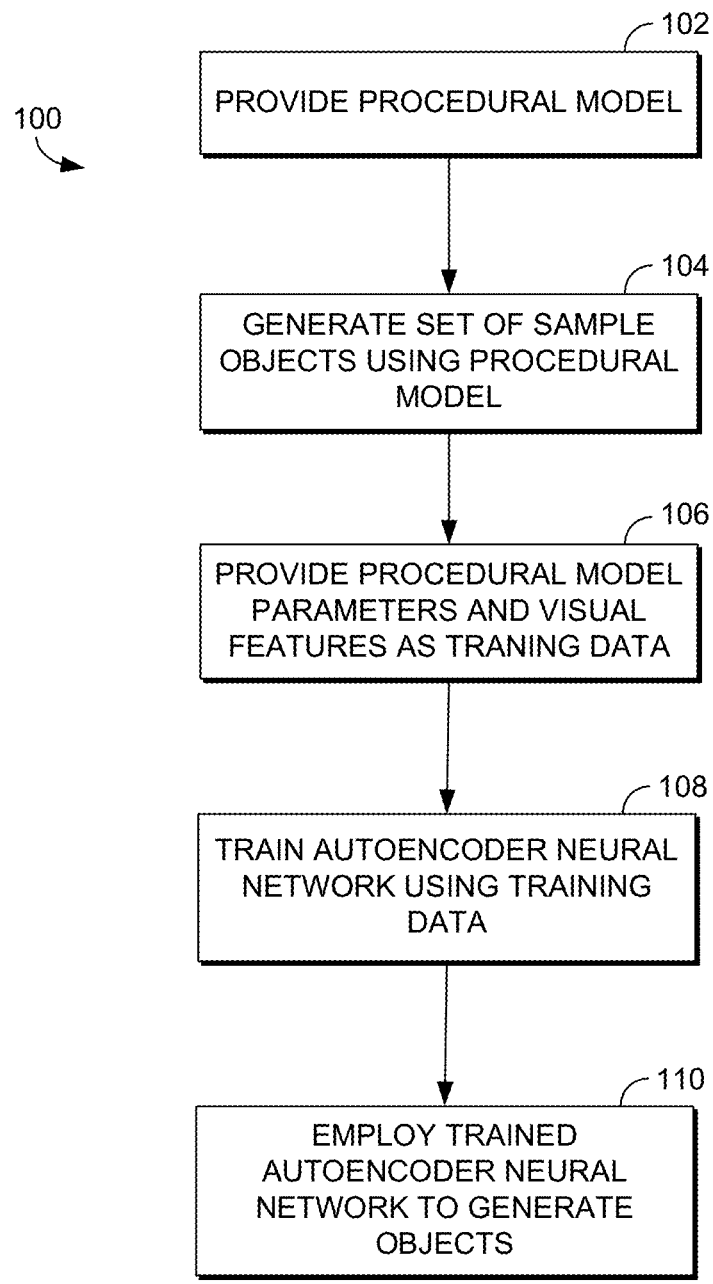
FIG. 1 is a flow diagram showing a method for training an autoencoder neural network that may be employed for generating objects in accordance with embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, procedural models allow users to create computer-generated objects. Each procedural model may be directed to generating a particular category of objects and may include a high number of procedural model parameters that a user may adjust to vary the generated objects. By way of example to illustrate, a procedural model may be directed to creating computer-generated trees. The procedural model parameters may include a parameter to adjust the thickness of the trunk, a parameter to control how far the trunk extends before it branches, a parameter to adjust a branching angle, a parameter to control the number of branches, a parameter to control the shapes of leaves or needles, a parameter to control the size of leaves or needles, as well as a variety of other parameters. Using such a procedural model, users could create a large variety of trees that drastically differ in appearance. However, given the large number of procedural model parameters, it may be very difficult and time-consuming for a user to generate a desired tree. For instance, one user may wish to generate an oak tree while another may wish to generate a pine tree. With a large number of procedural model parameters, it may be very unintuitive for a user to create the desired tree. An issue that complicates this problem is that some visual qualities of generated objects, such as the silhouette shape, are a factor of multiple procedural model parameters working together. As such, it may be hard for a user to get a particular visual quality because it's difficult to know which combination of procedural model parameters to adjust in combination to obtain that visual quality.

Embodiments of the present invention are generally directed to enabling generation of objects via an intuitive exploration of high-dimensional procedural modeling spaces using only a small number of parameters generated by an autoencoder neural network. Given a particular procedural model, a set of sample objects is generated for use in training an autoencoder neural network. The sample objects are generated using visual feature criteria (e.g., shape similarity) such that the sample objects are uniformly distributed in visual features rather than in procedural modeling parameters. In some embodiments, a categorization tree is employed to generate the uniformly distributed set of sample objects.

The sample objects are then used to train an autoencoder neural network in order to map the high number of procedural model parameters to a small number of new parameters. In particular, both procedural model parameters and visual features from the sample objects are used as training data to train the autoencoder neural network. Because small changes in procedural model parameters may result in drastic changes in the visual appearance of generated objects, training the autoencoder neural network using only the procedural model parameters would not provide any meaningful organization with respect to visual similarity among objects. As such, embodiments also employ visual features from the sample objects when training the autoencoder neural networks to generate a continuous object space with respect to visual similarity, resulting in an intuitive and predictable object navigation experience driven primarily by visual appearance. In order to generate new objects, a user interface may be provided that allows a user to adjust the small set of new parameters from the autoencoder neural network, which in turn uses those adjusted new parameters to output procedural modeling parameters. The output procedural modeling parameters may then be provided to the procedural model to generate a new object. Employing such a user interface, users may generate desired objects much more quickly and intuitively than using the original procedural model.

With reference now to FIG. 1, a flow diagram is provided that illustrates a method 100 for training an autoencoder neural network that may be employed for generating objects. Each block of the method 100 and any other method discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 100 may be performed using a computing device, such as the computing device 600 of FIG. 6.

Initially, as shown at block 102, a procedural model is provided that has a given number of parameters for which dimensionality reduction will be performed. The procedural model may be designed to generate a particular category of objects, which may be, for instance, an organic shape, such as trees and animated characters, or a man-made shape, such as buildings, furniture, and jewelry.

A set of sample objects is generated using the procedural model, as shown at block 102. The set of sample objects is generated in order to provide training data to train an autoencoder neural network to provide a reduced dimensional representation of the original procedural model. Because learning a reduced dimensional representation of the original procedural modeling space ultimately depends on the training data, the quality of this data becomes an important consideration. Specifically, it is desirable that the set of sample objects used for training data provides a uniform coverage of the input space with respect to the resulting visual appearance of objects rather than the underlying parameters of the procedural model.

Figure 2:
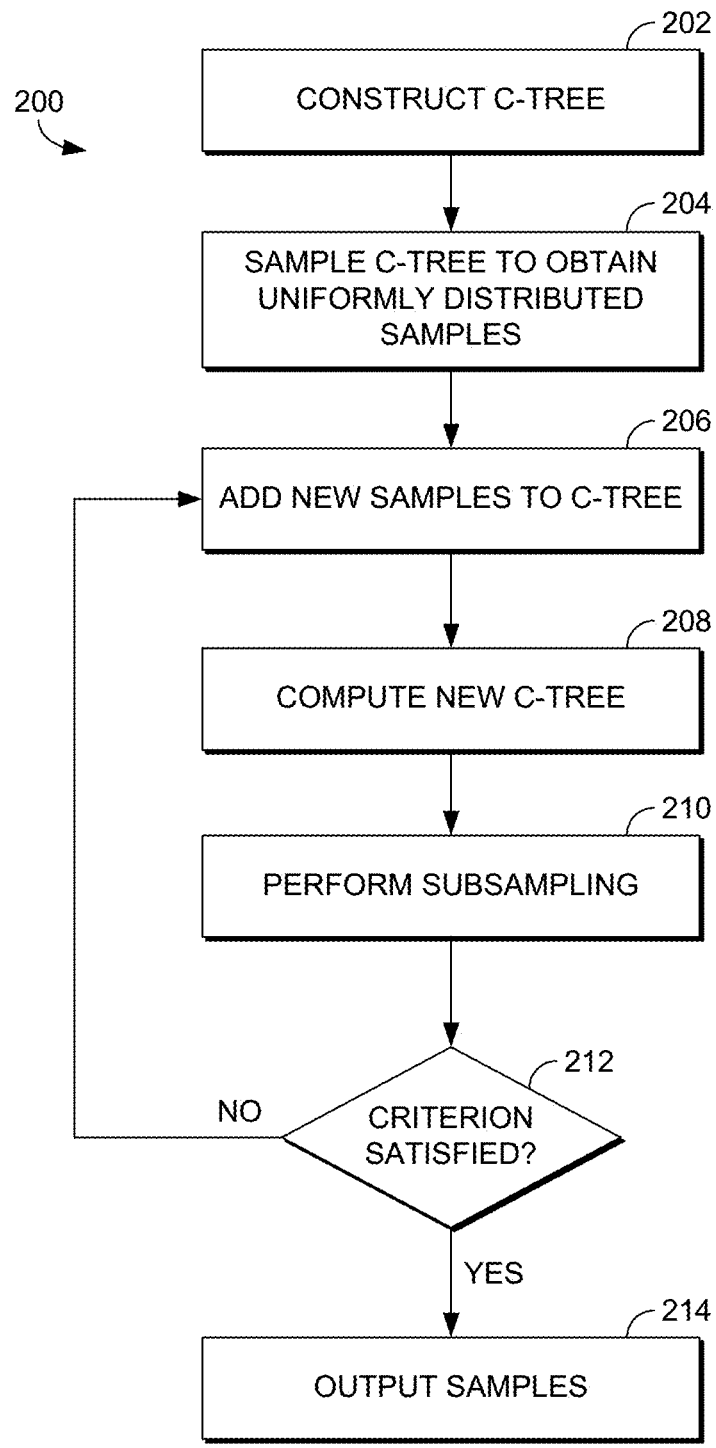
FIG. 2 is a flow diagram showing a method for generating a set of sample objects in accordance with embodiments of the present invention.

In accordance with some embodiments, categorization trees are used to sample objects with respect to a set of visual signatures (e.g., shape) followed by a uniform subsampling from the resulting C-trees, and iterating between these two steps until a final set of sample objects uniformly sample the visual space. This process is illustrated by the method 200 shown in FIG. 2.

Figure 3:
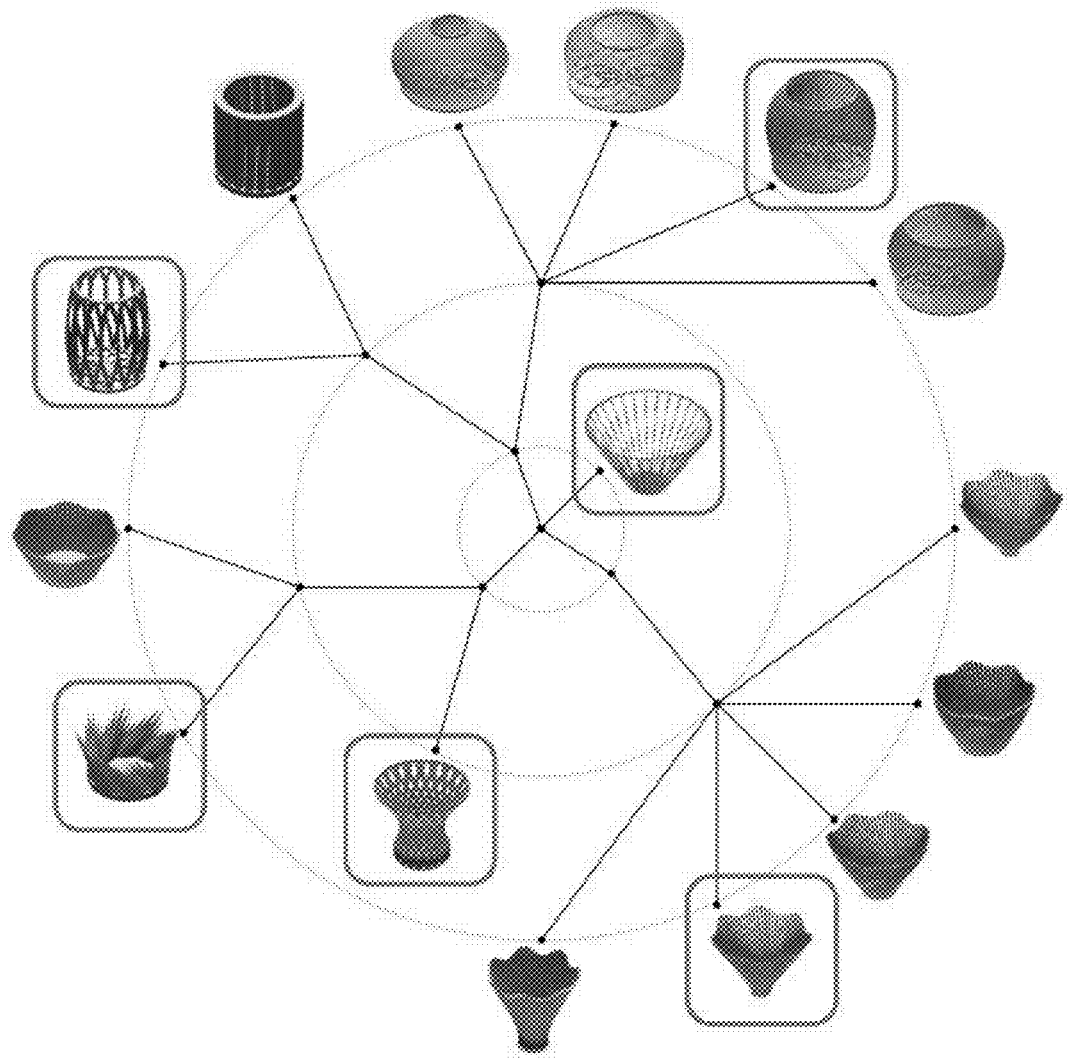
FIG. 3 is a diagram showing a categorization tree generated in accordance with an embodiment of the present invention.

As shown at block 202, an initial C-tree is generated using the procedural model to generate objects to populate the C-tree. A C-tree, inspired by the evolutionary trees in bioinformatics, is a hierarchical tree structure where each leaf corresponds to a unique object generated using the procedural model. As an example to illustrate, FIG. 3 shows a simplified C-tree with container objects. The C-tree may be constructed by assembling and reorganizing quartets of objects subject to visual constraints. A quartet is a tree of four leaves which forms the smallest bundle that can express meaningful visual relations. C-tree construction may begin by computing a set of quartets from the input objects which form the edges of a graph. The Quartets MaxCut algorithm may be applied to this graph to compute the resulting C-tree. A variety of different visual features (e.g., shape signatures) may be used in this process, as will be described in further detail below.

As shown at block 204, subsampling is performed. This includes sampling the C-tree to obtain sample objects uniformly distributed with respect to visual appearance. In some embodiments, uniform subtree sampling methods introduced for evolutionary trees may be employed. However, the polynomial time complexity renders these methods prohibitive when the desired sample size is in the thousands. Accordingly, in other embodiments, an approximate but fast method is used that uniformly samples from a probability distribution based on individual selection probabilities computed for each leaf node as follows:

$$P_i = \frac{(d_i \times s_i)^{-1}}{\Sigma_i (d_i \times s_i)^{-1}}$$

where $d_i$ is the depth of the node starting from the root node (e.g., center node in FIG. 3) and $s_i$ is the number of siblings (i.e., objects in the two-ring neighborhood). The probability of selection decreases if: (1) the number of siblings increases, or (2) the node is deeper in the tree. The first condition helps distribute the probability of selection equally among the nodes at the same depth between the immediate siblings. The second condition favors the nodes at shallower depths thereby concentrating on parts of the object space that have not been deeply explored.

To construct a training set of sample objects that reliably captures the visual appearance variation in objects, the method includes iteratively: (1) adding new samples to the objects forming the C-tree (as shown at block 206), (2) computing a new C-tree (as shown at block 208), and (3) performing subsampling (as shown at block 210). This process is continued until a determination is made at block 212 that a criterion has been satisfied to indicate that a uniformly distributed sample set has been provided. When that is reached, a set of sample objects is output, as shown at block 214. In some embodiments, the criterion used at block 212 is:

$$E_t - E_{t-1} < w(E_{t-1} - E_{t-2})$$

where $E_t$ is defined to be the potential energy in the C-tree at iteration t, and $0 < w < 1$ is a weighting constant. We define C-tree potential as $$E = \frac{1}{|S|} \sum_{i \in s} e_i$$

where S is the set of objects in the C-tree and $e_i$ is the potential of object i defined as:

$$e_i = \min |x_i - x_j| i, j \in S, i \neq j$$

where $x_i$ and $x_j$ are visual features of objects i and j respectively. This formulation penalizes large visual differences between an object and the one most similar to it thereby ensuring a homogeneous sampling of the design space. A variety of different visual features may be employed. In some configurations, the visual features are based on shape. Embodiments of the present invention are applicable to both 3D and 2D geometries. For 3D objects, the light field descriptor with shape context may be employed. In this approach, a 3D object is placed in a virtual sphere and multiple 2D renders of the object are computed using a set of camera placements on this sphere. From each render, a silhouette-based histogram is extracted and the results are concatenated to form the object's feature vector. This formulation is size invariant but is sensitive to rotations. However, because procedure modeling enables the generation of consistently oriented objects, rotational sensitivity does not impact the autoencoders. When the models are 2D objects, shape contexts may similarly be used to encode shape and additionally augment the object feature vector with texton histograms to encode appearance.

Figure 4B:
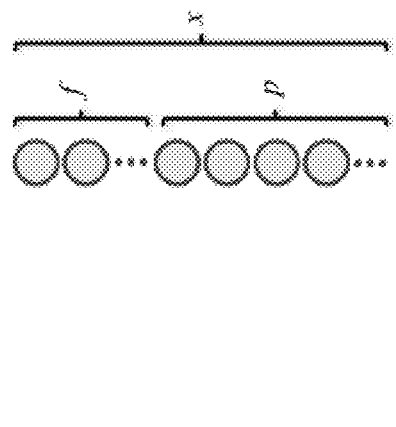
FIGS. 4A-4C are diagrams showing an autoencoder neural network trained in accordance with embodiments of the present invention.
Figure 4A:
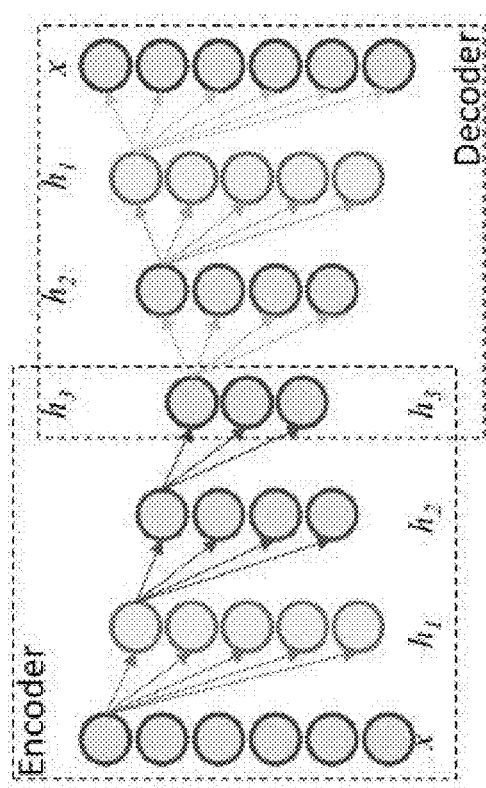
Figure 4C:
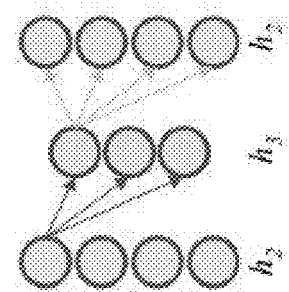
Figure 4C:
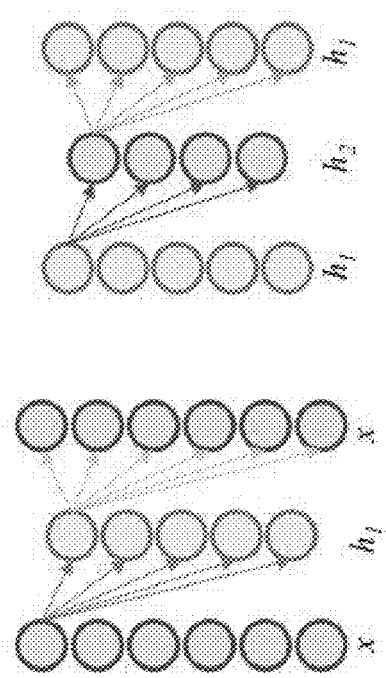

Returning to FIG. 1, using the set of sample objects, procedural model parameters and visual features are provided as training data, as shown at block 106. The procedural model parameters and visual features are used to train an autoencoder neural network, as shown at block 108. By way of example only to illustrate, a five hidden layer symmetric autoencoder neural network such as that shown in FIGS. 4A-4C may be employed. In FIGS. 4A-4C, x represents input and output variables, $h_{i-j}$ represents hidden layer neurons, f represents visual features of sample objects, and p represents procedural model parameters of sample objects. In such an embodiment, three bottleneck neurons may be used to facilitate design space visualization. The number of neurons for the hidden layers $h_1$ and $h_2$ based on the number of input layer neurons.

Conventional autoencoders work to replicate input vectors at the output layer. In the context of procedural modeling, this means if the input layer consists of the original procedural model parameters, the autoencoder will aim to reproduce these parameters at the output layer, albeit with a reduced set of bottleneck neurons. However, using such an approach, object navigation in the reduced dimensional space would remain cumbersome as no provision would exist to ensure visual (e.g., geometric) continuity.

To mitigate this issue in embodiments of the present invention, the autoencoder is augmented with additional nodes (vector f in FIG. 4B) that incorporate visual features, thereby simultaneously helping to organize the learned reduced dimensional space. This structuring takes place with respect to visual similarity and ensures visually (e.g., geometrically) similar objects appear close together in the low-dimensional space.

As noted above, a variety of different visual features may be employed. In some configurations, the visual features are based on shape. Embodiments of the present invention are applicable to both 3D and 2D geometries. For 3D objects, the light field descriptor with shape context may be employed. In this approach, a 3D object is placed in a virtual sphere and multiple 2D renders of the object are computed using a set of camera placements on this sphere. From each render, a silhouette-based histogram is extracted and the results are concatenated to form the object's feature vector. This formulation is size invariant but is sensitive to rotations. However, because PM enables the generation of consistently oriented objects, rotational sensitivity does not impact the autoencoders. When the models are 2D objects, shape contexts may similarly be used to encode shape and additionally augment the object feature vector with texton histograms to encode appearance.

In some embodiments, a visual feature weighted reconstruction error may be employed. The popular layer by layer training scheme may be utilized (FIG. 4C) followed by a fine-tuning pass over the network. The process may back-propagate an error function designed to equalize the importance of the procedural model parameters and the visual features. A nonuniform weighting scheme may be applied to the conventional back-propagation function (mean-squared reconstruction error) of an output neuron, n, over all examples as follows:

$$E_n = \frac{1}{I} w_n \sum_{i=1}^{I} (t_i - r_i)^2 \text{ where } w_n = \begin{cases} 1 & \text{if } n \in p \\ c \left| \frac{p}{f} \right| & \text{if } n \in f \end{cases}$$

where I is the number of samples; $t_i$ and $r_i$ are the target and the reconstructed values at the output neuron, respectively; p is the set of output neurons that correspond to procedural model parameters; and f is the set of output neurons encoding the visual features. The total network error is then:

$$E_{total} = \sum_{n=1}^{|p|+|f|} E_n$$

Parameter c enables control over the influence of procedural model parameters versus visual features. As c increases, the formulation becomes more sensitive to visual feature nodes. For a given procedural modeling rule set, c may be chosen that results in the smallest network error $E_n$ after a training of 1000 epochs. This weighting scheme is used only for the first hidden layer. For the remaining layers, the training may be carried out in the conventional way where the first hidden layer's neurons readily transmit the necessary weights to the subsequent layers.

In some embodiments, a denoising training scheme may be employed. For autoencoders, the denoising training scheme has proven to be superior to conventional training methods. The idea behind denoising is to make learning robust to partial corruption in the input. For each training sample, denoising works by providing as input set noise-added variations of the sample and engineer the network to reconstruct the original, noiseless sample. This works particularly well for feature learning in vision applications as the input image is often inherently noisy. Based on this observation, three alternatives may be employed: (1) denoising applied to both to the procedural model parameters and visual features, (2) denoising applied only to the procedural model parameters, 3) denoising applied only to the visual features.

Returning again to FIG. 1, once an autoencoder neural network is trained, it may be employed to generate objects, as shown at block 110. For instance, a user interface may be provided that allows a user to adjust parameters in the lower-dimensional space in order to generate the new objects. In some embodiments, the decoding part of the neural network may be used to generate the new objects (see FIG. 4A). Specifically, the nodes at the bottleneck may be used as input. Based on that input, procedural model parameters are generated at the output layer, and an object is generated using the procedural modeling rule set operating on those output procedural model parameters. While the number of bottleneck nodes can be arbitrary, these nodes dictate the dimensionality of the new parametric space. For instance, two- and three-bottleneck neuron configurations may be employed to provide two- and three-dimensional spaces.

Figure 5A:
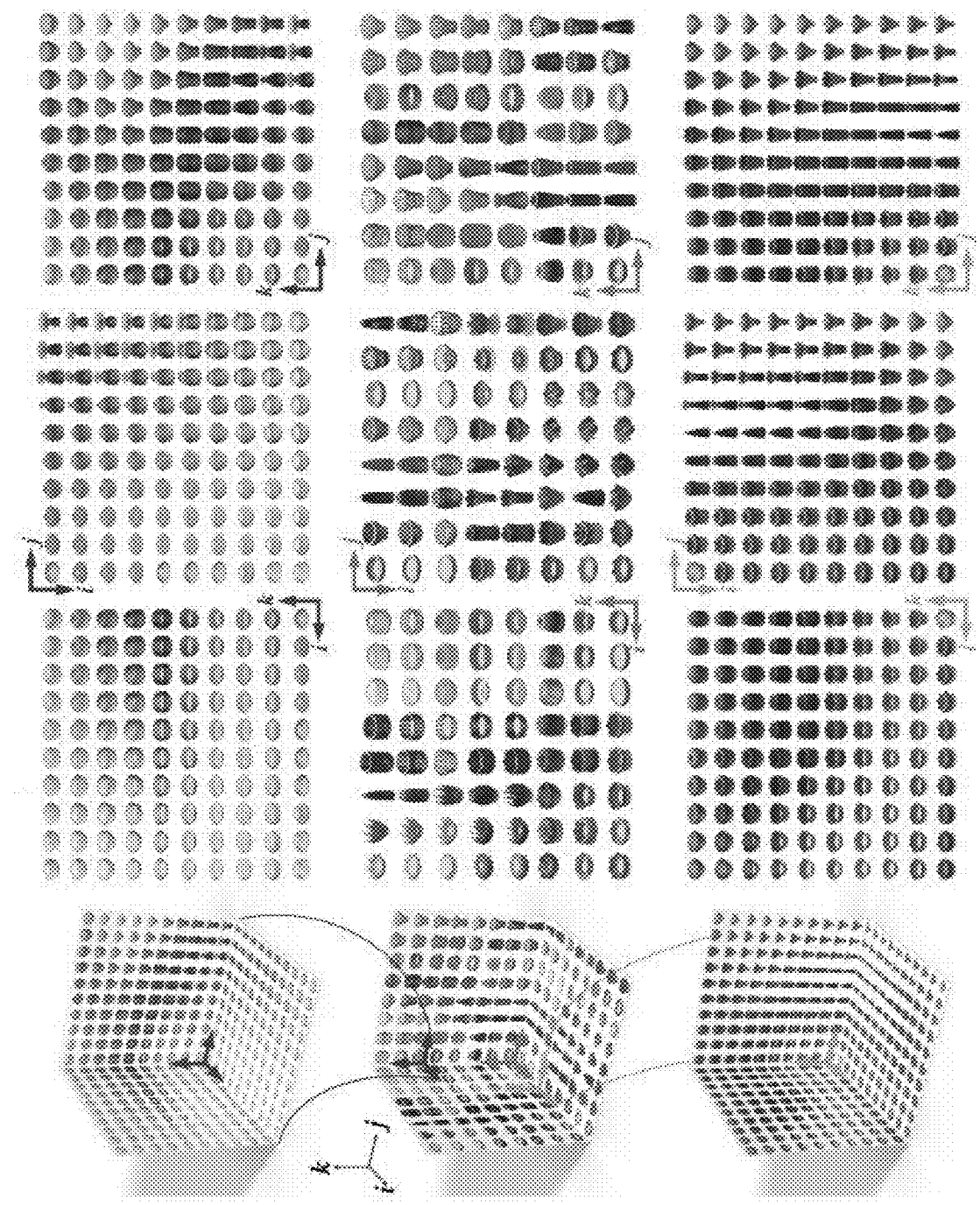
FIGS. 5A and 5B are diagrams that illustrate the effect of embodiments of the present invention using a procedural model that generates container objects.
Figure 5B:
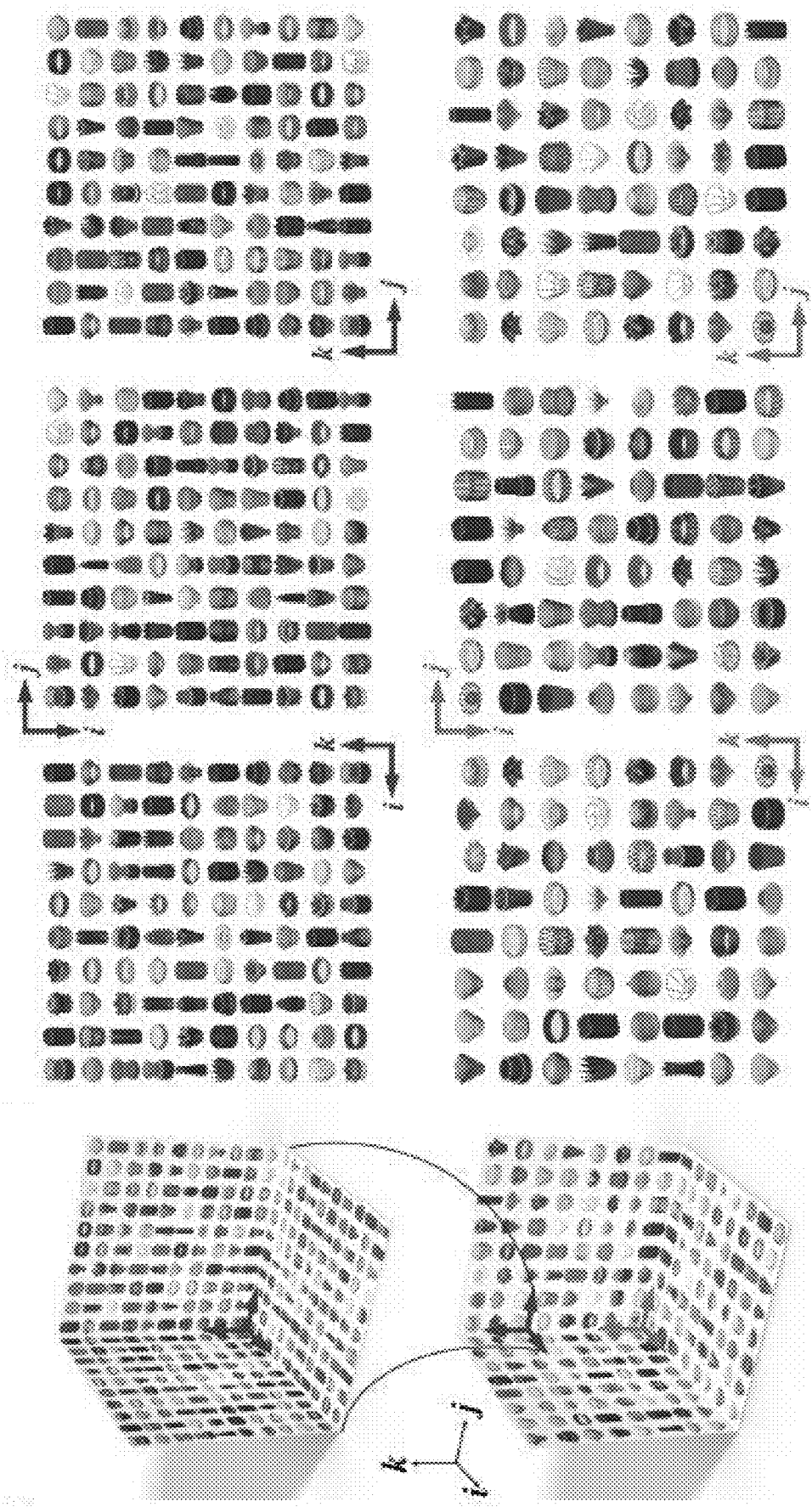

By way of example to illustrate, FIGS. 5A and 5B illustrate the effect of embodiments of the present invention using a procedural model that generates container objects. In particular, FIG. 5A illustrates an object space provided using embodiments of the present invention (using both dimensionality reduction and space organization), while FIG. 5B illustrates an object space involving dimensionality reduction only on procedural model parameters. As can be seen from FIGS. 5A and 5B, the approach in accordance with embodiments of the present invention produces a shape space that organizes the reduced dimensional space more favorably with respect to visual (e.g., shape) similarity.

Figure 6:
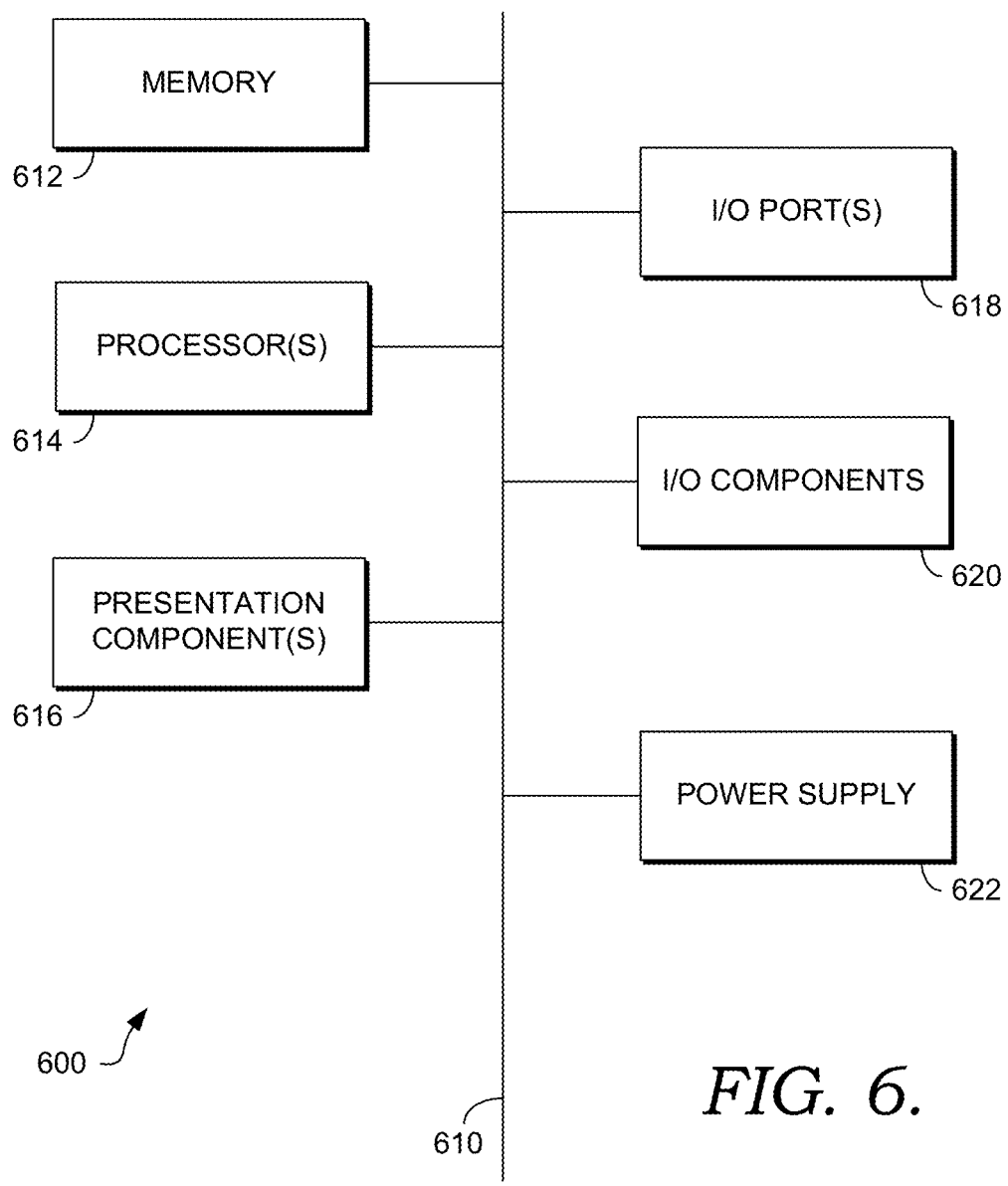
FIG. 6 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention are generally directed to providing an intuitive object-generation experience by reducing the dimensionality of a procedural model. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   generating a set of sample image objects using a procedural model having a plurality of procedural model parameters for generating image objects;
   providing procedural model parameter inputs used to generate each sample image object and visual features of each sample image object as training data;
   training an autoencoder neural network using the training data to map the plurality of procedural model parameters to a smaller number of new parameters; and
   generating a new image object by:
      receiving user input to adjust one or more of the new parameters of the trained autoencoder neural network to cause the trained autoencoder neural network to output a set of new procedural model parameter inputs, and
      providing the set of new procedural model parameter inputs to the procedural model to cause the procedural model to generate the new image object.

2. The one or more computer storage media of claim 1, wherein the set of sample image objects is generated by:
   generating a categorization tree using the procedural model to generate image objects to populate the categorization tree;
   sampling the categorization tree to obtain image objects uniformly distributed with respect to visual appearance; and
   iteratively adding additional image objects to the categorization tree, computing a new categorization tree, and sampling the new categorization tree until a criterion is satisfied.

3. The one or more computer storage media of claim 2, wherein sampling the categorization tree employs a probability distribution based on individual selection probabilities computed for each leaf node of the categorization tree as follows:

$$P_i = \frac{(d_i \times s_i)^{-1}}{\Sigma_i (d_i \times s_i)^{-1}}$$

wherein $d_i$ is a depth of a node i starting from a root node and $s_i$ is a number of siblings.

4. The one or more computer storage media of claim 2, wherein the criterion is:

$$E_t - E_{t-1} < w(E_{t-1} - E_{t-2})$$

wherein $E_t$ is potential energy in the categorization tree at iteration t, and $0 < w < 1$ is a weighting constant, wherein potential energy is computed as:

$$E = \frac{1}{|S|} \sum_{i \in s} e_i$$

where S is the set of image objects in the categorization tree and $e_i$ is a potential energy of image object i defined as:

$$e_i = \min |x_i - x_j| i, j \in S, i \neq j$$

wherein $x_i$ and $x_j$ are visual features of image objects i and j respectively.

5. The one or more computer storage media of claim 1, wherein the visual features from the sample image objects are based on shape.

6. The one or more computer storage media of claim 5, wherein the sample image objects are 3D objects and the visual feature for each sample image object is generated by:
   computing a plurality of 2D renders of the sample image object;
   extracting a silhouette-based histogram from each 2D render; and
   concatenating the silhouette-based histograms to form a feature vector for the sample image object.

7. The one or more computer storage media of claim 5, wherein the sample image objects are 2D objects and the visual feature for each sample image object comprises a feature vector based on a texton histogram of a shape of the sample image object.

8. The one or more computer storage media of claim 1, wherein the autoencoder neural network comprises a five hidden layer symmetric autoencoder neural network.

9. The one or more computer storage media of claim 1, wherein the operations further comprise generating a user interface that exposes the new parameters from the autoencoder neural network, the new parameters being adjustable via user interface elements to generate the new image object.

10. The one or more computer storage media of claim 9, wherein a decoding part of the autoencoder neural network is employed to generate the new image object, and wherein the new parameters adjustable via the user interface elements correspond with nodes at a bottleneck layer of the autoencoder neural network.

11. A computerized method comprising:
providing a procedural model having a plurality of procedural model parameters for generating image objects;
generating a set of sample image objects using the procedural model;
providing procedural model parameter inputs used to generate each sample image object and visual features of each sample image object as training data;
training an autoencoder neural network using the training data, the autoencoder neural network mapping the plurality of procedural model parameters to a set of new parameters, the new parameters being fewer in number than the procedural model parameters;
generating a user interface that exposes the set of new parameters via user interface elements allowing a user to adjust the new parameters:
receiving input via the user interface adjusting at least a portion of the new parameters to provide new parameter inputs;
providing the new parameter inputs to the autoencoder neural network to cause the autoencoder neural network to ouput new procedural model parameter inputs; and
providing the new procedural model parameter inputs to the procedural model to cause the procedural model to generate an output image object.

12. The method of claim 11, wherein the set of sample image objects is generated by:
generating a categorization tree using the procedural model to generate image objects to populate the categorization tree;
sampling the categorization tree to obtain image objects uniformly distributed with respect to visual appearance; and
iteratively adding additional image objects to the categorization tree, computing a new categorization tree, and sampling the new categorization tree until a criterion is satisfied.

13. The method of claim 12, wherein sampling the categorization tree employs a probability distribution based on individual selection probabilities computed for each leaf node of the categorization tree as follows:

$$P_i = \frac{(d_i \times s_i)^{-1}}{\Sigma_i (d_i \times s_i)^{-1}}$$

wherein $d_i$ is a depth of a node i starting from a root node and $s_i$ is a number of siblings.

14. The method of claim 12, wherein the criterion is:
$$E_t - E_{t-1} < w(E_{t-1} - E_{t-2})$$
wherein $E_t$ is potential energy in the categorization tree at iteration t, and $0 < w < 1$ is a weighting constant, wherein potential energy is computed as:

$$E = \frac{1}{|S|} \sum_{i \in s} e_i$$

wherein S is a set of image objects in the categorization tree and $e_i$ is the potential energy of image object i defined as:

$$e_i = \min |x_i - x_j| i, j \in S, i \neq j$$

wherein $x_i$ and $x_j$ are visual features of image objects i and j respectively.

15. The method of claim 11, wherein the visual features from the sample image objects are based on shape.

16. The method of claim 15, wherein the sample image objects are 3D objects and the visual feature for each sample image object is generated by:
computing a plurality of 2D renders of the sample image object;
extracting a silhouette-based histogram from each 2D render; and
concatenating the silhouette-based histograms to form a feature vector for the sample image object.

17. The method of claim 15, wherein the sample image objects are 2D image objects and the visual feature for each sample image object comprises a feature vector based on a texton histogram of a shape of the sample image object.

18. The method of claim 11, wherein the autoencoder neural network comprises a five hidden layer symmetric autoencoder neural network.

19. A computerized method comprising:
generating a set of sample image objects using a procedural model having a plurality of procedural model parameters for generating the set of sample image objects by:
generating a categorization tree using the procedural model to generate image objects to populate the categorization tree,
sampling the categorization tree to obtain image objects uniformly distributed with respect to visual appearance, and
iteratively adding additional image objects to the categorization tree, computing a new categorization tree, and sampling the new categorization tree until a criterion is satisfied;
providing procedural model parameter inputs used to generate each sample image object and visual features of each sample image object as training data
training an autoencoder neural network using the training data comprising the procedural model parameters and the visual features from the sample image objects to map the plurality of procedural model parameters to a set of new parameters; and
generating a user interface that exposes the set of new parameters from the autoencoder neural network, the user interface including user interface elements allowing a user to adjust the new parameters to generate new image objects;
receiving input via the user interface adjusting at least a portion of the new parameters to provide new parameter inputs;
providing the new parameter inputs to the autoencoder neural network to cause the autoencoder neural network to output new procedural model parameter inputs; and
providing the new procedural model parameter inputs to the procedural model to cause the procedural model generate an output image object.

* * * * *

UNITED STATES PATENT AND TRADEMARK OFFICE
CERTIFICATE OF CORRECTION

| | |
|---|---|
| PATENT NO. | : 10,552,730 B2 |
| APPLICATION NO. | : 14/788178 |
| DATED | : February 4, 2020 |
| INVENTOR(S) | : Mehmet Ersin Yumer et al. |

It is certified that error appears in the above-identified patent and that said Letters Patent is hereby corrected as shown below:

On the Title Page

In Column 2, item (56), Other Publications, Line 7, delete "Basd" and insert -- Based --, therefor.

In the illustrative figure, reference numeral 106, delete "TRANING" and insert -- TRAINING --.

Page 2, in Column 1, item (56), Other Publications, Line 1, delete "performacne Concolutional" and insert -- performance Convolutional --, therefor.

Page 2, in Column 1, item (56), Other Publications, Line 2, delete "Downloadd" and insert -- Downloaded --, therefor.

Page 2, in Column 1, item (56), Other Publications, Line 5, delete "ORgnization" and insert -- ORganization --, therefor.

Page 2, in Column 1, item (56), Other Publications, Line 6, delete "downlaoded" and insert -- downloaded --, therefor.

In the Drawings

In sheet 1 of 7, FIG. 1, reference numeral 106, Line 3, delete "TRANING" and insert -- TRAINING --, therefor.

In the Claims

Column 11, Line 27 (approx.), Claim 11, delete "ouput" and insert -- output --, therefor.

Column 12, Line 44, Claim 19, delete "data" and insert -- data; --, therefor.

Column 12, Line 64, Claim 19, before "generate" insert -- to --.

Signed and Sealed this
Nineteenth Day of May, 2020

Andrei Iancu
*Director of the United States Patent and Trademark Office*